(12) United States Patent
Suzuki et al.

(10) Patent No.: US 12,191,717 B2
(45) Date of Patent: Jan. 7, 2025

(54) ROTOR WITH COOLING FLUID FLOW CHANNELS FORMED IN PERMANENT MAGNETS

(71) Applicant: IHI Corporation, Tokyo (JP)

(72) Inventors: Fuminori Suzuki, Tokyo (JP); Naoki Seki, Tokyo (JP)

(73) Assignee: IHI Corporation, Tokyo (JP)

( * ) Notice: Subject to any disclaimer, the term of this patent is extended or adjusted under 35 U.S.C. 154(b) by 261 days.

(21) Appl. No.: 17/657,976

(22) Filed: Apr. 5, 2022

(65) Prior Publication Data

US 2022/0231559 A1 Jul. 21, 2022

Related U.S. Application Data

(63) Continuation of application No. PCT/JP2020/046341, filed on Dec. 11, 2020.

(30) Foreign Application Priority Data

Mar. 25, 2020 (JP) .................................. 2020-053918

(51) Int. Cl.
*H02K 1/32* (2006.01)
*H02K 1/278* (2022.01)
*H02K 1/28* (2006.01)

(52) U.S. Cl.
CPC ............... *H02K 1/32* (2013.01); *H02K 1/278* (2013.01); *H02K 1/28* (2013.01)

(58) Field of Classification Search
CPC ............ H02K 1/32; H02K 9/19; H02K 9/193; H02K 9/197; H02K 1/278; H02K 1/2781; H02K 1/28; H02K 21/14; H02K 2201/03

(Continued)

(56) References Cited

U.S. PATENT DOCUMENTS

| 5,744,887 A | * | 4/1998 | Itoh | H02K 1/278 310/156.28 |
| 2008/0238234 A1 | * | 10/2008 | Saban | H02K 1/278 310/156.31 |

(Continued)

FOREIGN PATENT DOCUMENTS

| CA | 2810563 A1 * | 3/2012 | ............. H02K 1/278 |
| EP | 2 562 914 A1 | 2/2013 | |

(Continued)

OTHER PUBLICATIONS

International Search Report issued Mar. 2, 2021 in PCT/JP2020/046341 filed Dec. 11, 2020, 2 pages.

(Continued)

*Primary Examiner* — Michael Andrews
(74) *Attorney, Agent, or Firm* — Oblon, McClelland, Maier & Neustadt, L.L.P.

(57) ABSTRACT

A rotor of an electrical rotating device includes a rotor core, plural permanent magnets mounted on an outer circumference of the rotor core, a retaining sleeve that holds the permanent magnets from their outer side, a cooling fluid flow channel formed on each surface of the permanent magnets on a side of the retaining sleeve [or on each surface on a side of the rotor core], and a seal ring. The retaining sleeve is configured of plural divided sleeves divided along a direction of a rotation axis of the rotor. A seam is formed between adjacent divided sleeves in the plural divided sleeves. The seal ring covers the seam from an outer circumferential side [or an inner circumferential side].

6 Claims, 5 Drawing Sheets

(58) Field of Classification Search
USPC .................... 310/61, 156.28, 156.29, 156.31
See application file for complete search history.

(56) References Cited

U.S. PATENT DOCUMENTS

| | | | | |
|---|---|---|---|---|
| 2010/0019602 A1* | 1/2010 | Saban | .................... | H02K 1/165 |
| | | | | 310/156.28 |
| 2018/0316233 A1 | 11/2018 | Miyamae et al. | | |
| 2019/0036404 A1 | 1/2019 | Takano et al. | | |

FOREIGN PATENT DOCUMENTS

| | | | |
|---|---|---|---|
| JP | 8-205438 A | 8/1996 | |
| JP | 2013-201853 A | 10/2013 | |
| JP | 2017-85778 A | 5/2017 | |

OTHER PUBLICATIONS

Extended European Search Report issued Mar. 14, 2024 in European Patent Application No. 20926751.7, 8 pages.

* cited by examiner

ROTOR WITH COOLING FLUID FLOW CHANNELS FORMED IN PERMANENT MAGNETS

CROSS REFERENCE TO RELATED APPLICATIONS

This application is a continuation application of International Application No. PCT/JP2020/046341, filed on Dec. 11, 2020, which claims priority to Japanese Patent Application No. 2020-53918, filed on Mar. 25, 2020, the entire contents of which are incorporated by reference herein.

BACKGROUND

1. Technical Field

The present disclosure relates to a rotor of an electrical rotating device.

2. Description of the Related Art

Japanese Unexamined Patent Application Publication No. 2017-85778 (Patent Literature 1) discloses an electrical rotating device. The electrical rotating device disclosed in the Patent Literature 1 is an SPM (Surface Permanent Magnet) type electrical rotating device, in which permanent magnets are mounted on an outer circumference of its rotor. In this electrical rotating device, a retaining sleeve is attached over the permanent magnets to prevent the permanent magnets from being detached from the rotor by a centrifugal force of the rotating rotor. Furthermore, in this electrical rotating device, the above-mentioned retaining sleeve is divided into plural divided sleeves along a direction of a rotation axis of the rotor in order to suppress heat generation due to eddy current loss in the retaining sleeve.

SUMMARY

There is a desire to use an SPM type electrical rotating device having the above-described structure in a higher temperature environment. Since performance of permanent magnets of a rotor degrades at a high temperature, circulation of cooling fluid inside the rotor is evaluated in order to cool the permanent magnets. Cooling fluid flow channels are formed by closing grooves formed on surfaces of the permanent magnets, which are to be cooled, by a member in contact with the permanent magnets. In this case, it is concerned that a centrifugal force associated with rotations of the rotor may cause the cooling fluid to flow outside from its outer circumference. Furthermore, if a retaining sleeve configured of plural divided sleeves divided along the axial direction as described above, it is concerned that the cooling fluid may leak outside the rotor through a seam between the adjacent divided sleeves.

An object of a rotor of an electrical rotating device according to the present disclosure is to cool permanent magnets in an SPM type electrical rotating device more reliably.

A rotor of an electrical rotating device according to the present disclosure comprises a rotor core; a plurality of permanent magnets mounted on an outer circumference of the rotor core, a retaining sleeve that is configured of a plurality of divided sleeves divided along a direction of a rotation axis of the rotor and holds the plurality of permanent magnets from an outer side of the plurality of permanent magnets; a seam formed between adjacent divided sleeves in the plurality of divided sleeves; a cooling fluid flow channel formed on each surface of the plurality of permanent magnets on a side of the retaining sleeve, or on each surface of the plurality of permanent magnets on a side of the rotor core; and a seal ring that covers the seam from an outer circumferential side or an inner circumferential side.

The cooling fluid flow channel may be formed on the each surface of the plurality of permanent magnets on the side of the retaining sleeve.

Here, the seam may comprise one or more seams, and the seal ring may be a single hollow cylindrical member that covers all of the seams, and disposed between the retaining sleeve and the plurality of permanent magnets.

On the other hand, the cooling fluid flow channel may be formed on the each surface of the plurality of permanent magnets on the side of the rotor core.

Here, the seam may comprise one or more seams, and the seal ring may be a single hollow cylindrical member that covers all of the seams, and disposed between the retaining sleeve and the plurality of permanent magnets.

Or, the seam may comprise one or more seams, and the seal ring may be configured of a plurality of annular members which are aligned in the direction of the rotation axis and each of which covers at least one of the seams, and disposed between the retaining sleeve and the plurality of permanent magnets.

Or, the seam may comprise one or more seams, and the seal ring is a single hollow cylindrical member that covers all of the seams, and disposed on an outer circumferential face of the retaining sleeve.

Or, the seam may comprise one or more seams, and the seal ring may be configured of a plurality of annular members which are aligned in the direction of the rotation axis and each of which covers at least one of the seams, and disposed on an outer circumferential face of the retaining sleeve.

The seal ring is made of metal.

Or, the seal ring is made of CFRP.

By the rotor of an electrical rotating device according to the present disclosure, it becomes possible to cool permanent magnets in an SPM type electrical rotating device more reliably.

DESCRIPTION OF THE EMBODIMENTS

Hereinafter, embodiments will be described with reference to the drawings.

Figure 1:
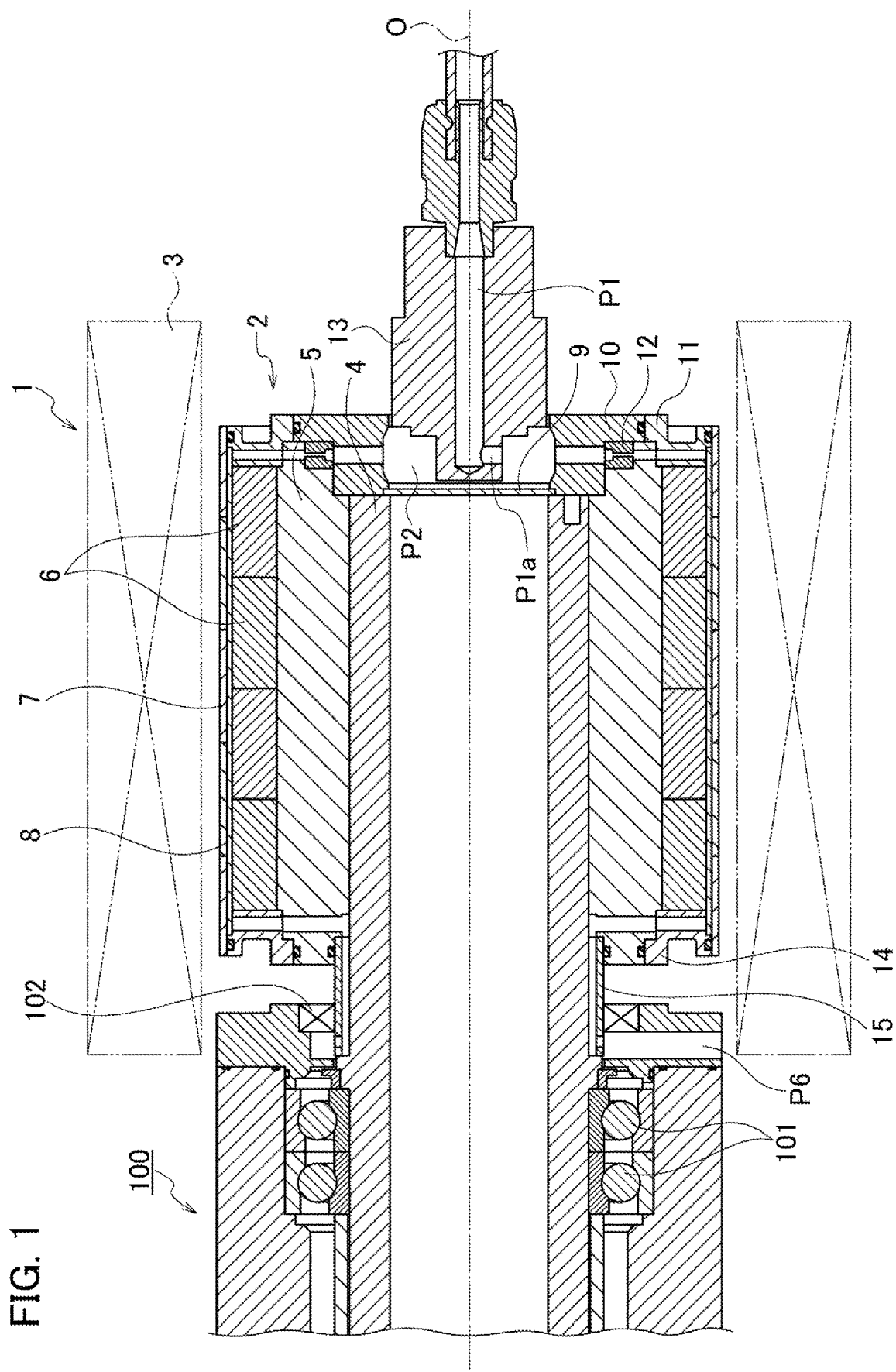
FIG. 1 is a cross-sectional view including a rotation axis of a rotor according to a first embodiment.
Figure 2:
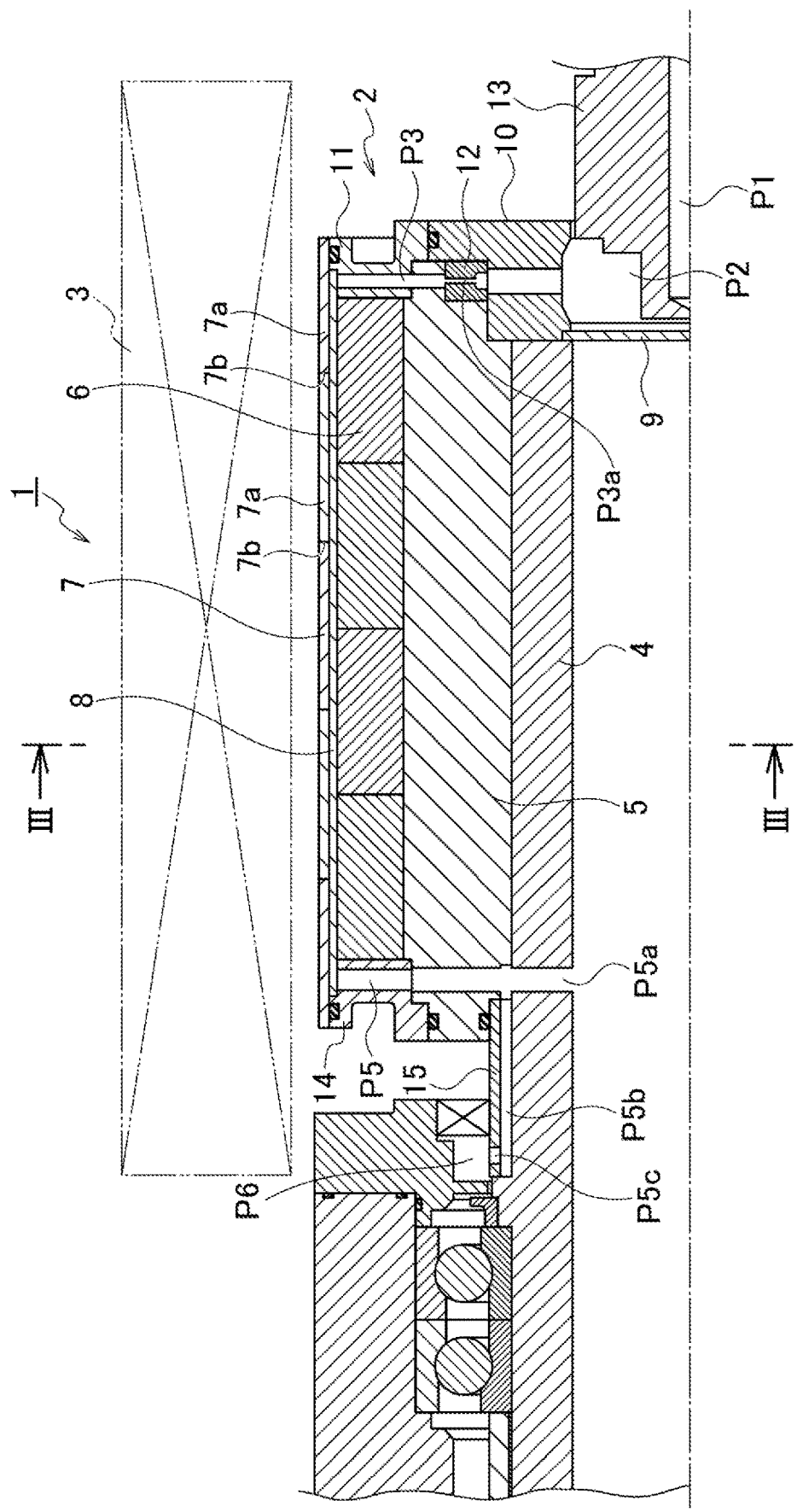
FIG. 2 is an enlarged cross-sectional view including the rotation axis of the rotor.
Figure 3:
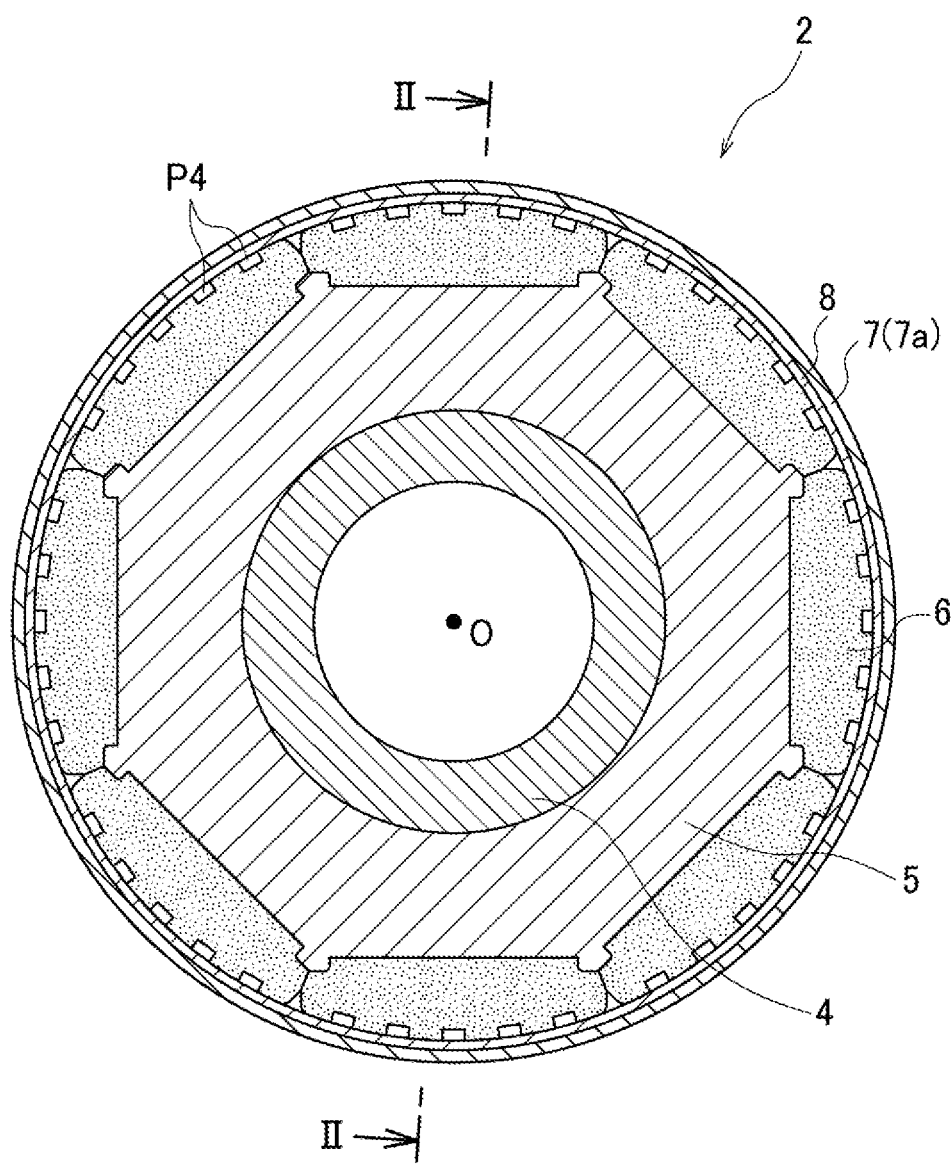
FIG. 3 is a cross-sectional view perpendicular to the rotation axis of the rotor.

FIG. 1 to FIG. 3 show a rotor 2 of an electrical rotating device 1 according to a first embodiment. Note that FIG. 2 is a cross-sectional view taken along a line II-II in FIG. 3, and FIG. 3 is a cross-sectional view taken along a line in FIG. 2.

The electrical rotating device 1 in this embodiment functions as an electrical generator. The electrical generator (electrical rotating device) 1 has a rotor 2 that rotates about a rotation axis O, and a stator 3 arranged outside the rotor 2. A rotation shaft 4 of the rotor 2 is monolithically formed with a rotation shaft of an external device 100. The electrical generator 1 of the present embodiment is exposed to high temperature due to heat radiated from the external device 100. The electrical generator 1 generates electrical power when the rotor 2 is rotated by the rotation shaft 4 rotated by the external device 100. The rotation shaft 4 in the present embodiment is a hollow shaft. The rotation shaft 4 extended from the rotor 2 to the external device 100 is rotatably supported by bearings 101 inside the external device 100.

The rotor 2 further includes a rotor core 5, permanent magnets 6, and a retaining sleeve 7. The rotor core 5 is non-rotatably mounted on the rotation shaft 4, and is configured of laminated electromagnetic steel plates. The permanent magnets 6 are mounted on the outer circumferential face of the rotor core 5 so as to be aligned in a circumferential direction. The retaining sleeve 7 is disposed outside the permanent magnets 6. In other words, the electrical generator 1 of the present embodiment is an SPM type electrical generator (an electrical rotating device). The rotor core 5 is configured of many octagonal electromagnetic steel plates laminated in a direction of the rotation axis O, i.e., a rotation axis direction, as shown in FIG. 3. The permanent magnets 6 are attached to each side of the octagon of the rotor core 5, and thereby eight of them are aligned in the circumferential direction. In addition, the four permanent magnets 6 are also aligned in the rotation axis direction as shown in FIG. 1 and FIG. 2. In other words, eight rows of the permanent magnets 6 parallel to the rotation axis direction are formed on the circumference of the rotor core 5.

The retaining sleeve 7 is a hollow cylindrical metal member placed outside the permanent magnets 6, and holds the permanent magnets 6 so as to prevent the permanent magnets 6 from coming off the rotor core 5 due to the centrifugal force while the rotor 2 rotates. It is conceivable to form the retaining sleeve 7 with fiber-reinforced plastics (e.g., CFRP), but the electrical generator 1 of the present embodiment operates in a high-temperature environment as described above. Therefore, the retaining sleeve 7 of the present embodiment is formed by metal instead of plastics. The metal retaining sleeve 7 can sufficiently hold the permanent magnets 6 because there is little change in its strength and rigidity even in a high temperature environment. The metal retaining sleeve 7 generates eddy currents due to fluctuations in magnetic flux density while the rotor 2 rotates, and the retaining sleeve 7 generates heat. In the present embodiment, the retaining sleeve 7 is divided into five divided sleeves 7a along the rotation axis direction to reduce the eddy currents in order to prevent the permanent magnets 6 from being heated by the heat of the retaining sleeve 7.

The adjacent divided sleeves 7a are closely contacted with each other, and an entire of the retaining sleeve 7 configured of the plural divided sleeves 7a forms a hollow cylindrical shape covering all the permanent magnets 6. The divided positions of the retaining sleeve 7 along the rotation axis direction are arranged such that their divided positions do not coincide with the divided positions of the permanent magnets 6 along the rotation axis direction. The electrical resistance between the adjacent divided sleeves 7a increases by dividing the entire of the retaining sleeve 7 to the plural divided sleeves 7a, and thereby the chain magnetic flux per each of the divided sleeves 7a decreases. As the result, the eddy currents are reduced and the losses are also reduced, and thereby the heat generation due to the eddy current losses can be also reduced.

In the present embodiment, a hollow cylindrical seal ring 8 is disposed between the permanent magnets 6 and the retaining sleeve 7. The seal ring 8 prevents cooling fluid (cooling oil) circulating inside the rotor 2 from leaking outside the rotor 2 through seams 7b between the adjacent divided sleeves 7a. The circulation of the cooling fluid and the seal ring 8 will be described in detail later.

A circular end plate 9 and a first retaining ring 10 are attached to an end of the rotation shaft 4, which is a hollow shaft, on an opposite side to the external device 100. The end plate 9 closes an inner space of the hollow rotation shaft 4. A second retaining ring 11 is attached to the outer circumference of the first retaining ring 10. The inner periphery of the first retaining ring 10 is attached to the end of the rotation shaft 4, and its outer periphery, together with the inner periphery of the second retaining ring 11, holds the rotor core 5 from outside along the rotation axis direction. The outer periphery of the second retaining ring 11 holds the permanent magnets 6 from outside along the rotation axis direction. An orifice ring 12 is disposed at the end of the rotor core 5 in the rotation axis direction, and the orifice ring 12 is retained by the first retaining ring 10.

The outer circumferential edge of the second retaining ring 11 is in contact with the inner circumferential face of the above-mentioned retaining sleeve 7. An O-ring is provided between the first retaining ring 10 and the second retaining ring 11. An O-ring is also provided between the second retaining ring 11 and the retaining sleeve 7. These O-rings prevent leakage of the cooling fluid. A joint shaft 13 is connected to a center hole of the first retaining ring 10. The joint shaft 13 is connected to a delivery pump of the cooling fluid and to a supply source of the cooling fluid through several components.

A third retaining ring 14 is attached at the end of the rotation shaft 4 on a side of the external device 100 symmetrically with the above-mentioned second retaining ring 11. The third retaining ring 14 is disposed on the outer circumferential face of the rotor core 5. The outer circumferential edge of the third retaining ring 14 is in contact with the inner circumferential face of the retaining sleeve 7. The third retaining ring 14 holds the permanent magnets 6 from outside along the rotation axis direction.

In addition, a collar 15 is mounted between the inner circumference of the rotor core 5 and the rotation shaft 4. The peripheral end of the collar 15 on a side of the rotor 2 is attached to the inner periphery of the rotor core 5, and its peripheral end on the opposite side is attached to the rotation shaft 4 inside the external device 100. The outer circumferential face of the collar 15 is slidably in contact with an oil seal 102 of the external device 100 in a liquid-tight manner. Also, a gap is formed between the inner circumferential face of the collar 15 and the outer circumferential face of the rotation shaft 4. An O-ring is installed between the rotor core 5 and the third retaining ring 14. An O-ring is also installed between the rotor core 5 and the collar 15. An O-ring is also installed on the contact circumferential face of the third retaining ring 14 and the retaining sleeve 7. These O-rings also prevent leakage of the cooling fluid.

Next, circulation paths of the cooling fluid will be described with reference to FIG. 2. A supply channel P1 is formed inside the joint shaft 13 along the rotation axis O. At the downstream end of the supply channel P1, a connecting hole P1a (see FIG. 1) is formed in the radial direction, which connects to the storage chamber P2 surrounded by the joint shaft 13, the end plate 9 and the first retaining ring 10. The annularly formed storage chamber P2 stores the cooling fluid supplied through the supply channel P1. Plural introduction channels P3 are formed in the radial directions, that is, radially, from the storage chamber P2.

Each of the introduction channels P3 passes through the first retaining ring 10, the orifice ring 12 and the second retaining ring 11. An orifice P3a is formed in the middle of the introduction channel P3, that is, in the orifice ring 12. The orifice P3a controls the amount of the cooling fluid passing through the introduction channel P3. Each outer end of the introduction channels P3 reaches the seal ring 8.

Five axial flow channels P4 (see FIG. 3) parallel to the rotation axis direction are formed on each outer surface of the permanent magnets 6. The axial flow channels P4 are cooling fluid flow channels formed on the surfaces of the permanent magnets 6. One ends of the axial flow channels P4 are connected to the outer circumferential ends of the above-mentioned introduction channels P3 in a one to one manner. On the other hand, the other ends of the axial flow channels P4 are connected to eduction channels P5 in a one to one manner, which are similar to the introduction channels P3. The plural eduction channels P5 are formed in the radial directions, that is, radially. Each of the eduction channels P5 penetrates the third retaining ring 14 and the rotor core 5.

Each outer end of the eduction channels P5 also reaches the seal ring 8. In addition, inner ends of the eduction channel P5 reach the rotation shaft 4 and are communicated with each other in the circumferential direction (to form an annular flow channel). At least one discharge hole P5a is formed at the inner ends (the annular flow channel) of the eduction channels P5, which penetrates the rotation shaft 4. Part of the cooling fluid is discharged into an internal space of the rotation shaft 4 through the discharge hole P5a.

In addition, a tubular channel P5b is also formed at the inner ends (the annular flow channel) of the eduction channels P5, which is formed along the rotation axis direction toward the external device 100. The tubular flow channel P5b is formed by the above-mentioned gap between the inner circumferential face of the collar 15 and the outer circumferential face of the rotation shaft 4. Plural discharge holes P5c are formed at an end of the collar 15 on a side of the external device 100, and communicate with an annular flow channel P6 (see also FIG. 1).

The flow of the cooling fluid will be described. The cooling fluid supplied to the storage chamber P2 flows toward the outer circumference in the introduction channels P3 by the supplied fluid pressure (and the centrifugal force due to the rotations of the rotor 2). Here, the flow rate of the cooling fluid is controlled by the orifices P3a. The cooling fluid is introduced into the axial flow channels P4 from the outer circumferential ends of the introduction channels P3, and cools the permanent magnets 6 while flowing through the axial flow channels P4. In the present embodiment, since the axial flow channels P4 are formed on the surface of the permanent magnets 6 on a side of the retaining sleeve 7, the cooling fluid also cools the retaining sleeve 7 while flows through the axial flow channels P4.

The cooling fluid after flowing through the axial flow channels P4 is discharged to the eduction channels P5, and then part thereof is discharged to the inside of the rotation shaft 4 through the discharge hole(s) P5a and collected by the external device 100. In addition, the cooling fluid discharged to the eduction channels P5 flows through the tubular channel P5b, and then is discharged into the annular flow channel P6 through the discharge hole(s) P5c. The cooling fluid flowing through the tubular channel P5b cools the collar 15 which is supported by the oil seal 102. Furthermore, the cooling fluid flowing through the annular channel P6 also cools a portion near the bearings 101 (including a portion of the rotation shaft 4 supported by the bearings 101). The cooling fluid after flowing through the annular channel P6 is also collected by the external device 100.

Next, the seal ring 8 disposed between the permanent magnets 6 and the retaining sleeve 7 will be described. As described above, the retaining sleeve 7 in the present embodiment is configured of the plural divided sleeves 7a divided in the rotation axis direction. Therefore, the seams 7b are formed between the adjacent divided sleeves 7a. The seal ring 8 prevents the cooling fluid flowing in the axial flow channels P4 from leaking through the seams 7b due to the centrifugal force generated by the rotations of the rotor 2. The seal ring 8 covers the seams 7b on a side of the inner face of the retaining sleeve 7 to prevent the cooling fluid from leaking through the seams 7b.

The seal ring 8 in the present embodiment is made of metal in consideration of heat resistance. However, the seal ring 8 may be formed of resin, for example, fiber reinforced plastics, more specifically, CFRP. Since CFRP has high strength and high rigidity in its tensile direction, it can firmly hold the permanent magnets 6. In addition, the resin can exert higher sealing performance for the seams 7b than the metal. The matrix resin of CFRP in this case is a thermosetting resin.

Note that the retaining sleeve 7 (the divided sleeves 7a) is attached onto the outside of the permanent magnets 6 by shrink fitting or hydraulic dilation fitting. The seal ring 8 is interposed between the permanent magnets 6 and the retaining sleeve 7 when the retaining sleeve 7 is installed. In a case of the shrink fitting, the heat used for expanding the retaining sleeve 7 may be used to cure the CFRP matrix resin (the thermosetting resin) of the seal ring 8. In a case of the hydraulic dilation fitting, the hydraulic pressure is used to expand the retaining sleeve 7. These filling methods are also known as interference fitting, friction fitting, or press fitting.

Figure 4:
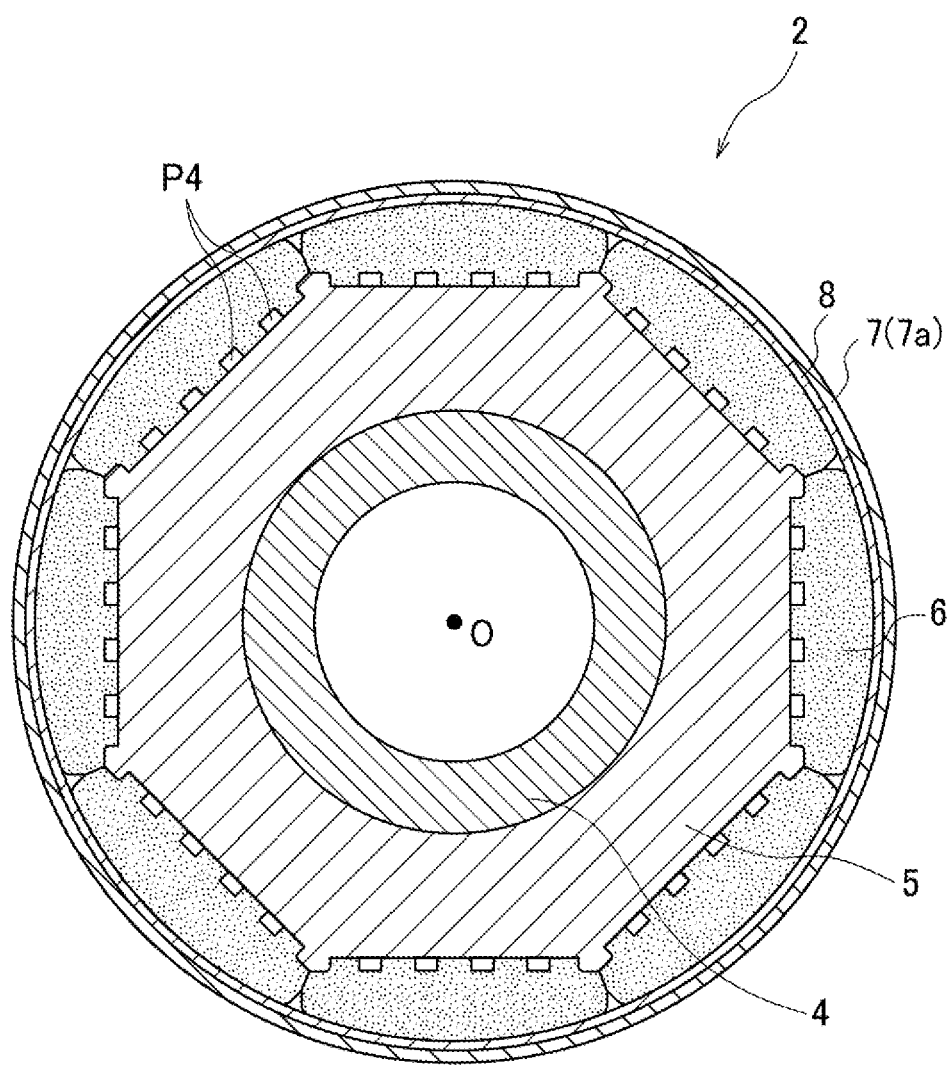
FIG. 4 is a cross-sectional view perpendicular to a rotation axis of a rotor according to a second embodiment.

Next, the rotor 2 according to a second embodiment will be described with reference to FIG. 4. Note that, identical or equivalent configurational components to those in the first embodiment will be labelled by reference signs identical to those in the first embodiment, and their detailed descriptions will be omitted. There is a difference between the rotor 2 of the present embodiment and the rotor 2 of the first embodiment in a position where the axial flow channels P4 are formed. The axial flow channels P4 of the first embodiment are formed on each surface of the permanent magnets 6 on a side of the retaining sleeve 7. The axial flow channels P4 of the present embodiment are formed on each surface of the permanent magnets 6 on a side of the rotor core 5. In other words, the four axial flow channels P4 parallel to the rotation axis direction are formed on each inner circumferential face of the permanent magnets 6.

In association with this, each outer ends of the introduction channels P3 and the eduction channels P5 doesn't reach the seal ring 8, but is terminated at the position of the axial flow channels P4. The introduction channels P3 and the eduction channels P5 are connected to the axial flow channels P4 in a one to one manner. The cooling fluid flowing through the axial flow channels P4 can cool the rotor core 5 along with the permanent magnets 6.

Even when the axial flow channels P4 are formed between the permanent magnets 6 and the rotor core 5, the centrifugal force associated with the rotations of the rotor 2 may cause the cooling fluid to pass through seams between the components and then reach the retaining sleeve 7. However, since the seal ring 8 is also provided in the present embodiment, the cooling fluid can be prevented from leaking through the seams 7b of the divided sleeves 7a.

The seal ring 8 in the first embodiment and the second embodiments described above is a single hollow cylindrical member that covers all of the seams 7b. However, in the second embodiment, the seal ring 8 is sandwiched between the outer circumferential faces of the permanent magnets 6 and the inner circumferential face of the retaining sleeve 7 along its entire circumference (the seal ring 8 is not sandwiched at positions of the axial flow channels P4 in the first embodiment). Therefore, the seal ring 8 of the second embodiment may be configured of plural annular members each of which covers at least one of the seams 7b, instead of the single hollow cylindrical member that covers all of the seams 7b (a modified example of the second embodiment). In this case, the plural annular members may be aligned in the rotation axis direction and interspaces along the axial direction may be formed between the adjacent annular members.

Even if the interspaces along the rotation axis direction are formed between the adjacent annular members, the seams 7b of the retaining sleeve 7 are covered by the seal ring 8 (the annular members). Therefore, leakage of the cooling fluid through the seams 7b is prevented. In addition, the interspaces between the annular members also form gaps along the radial direction between the permanent magnets 6 and the retaining sleeve 7. Even if the cooling fluid flows into these gaps, the permanent magnets 6 and the retaining sleeve 7 are cooled by the cooling fluid. Each of the annular members may cover only one of the seams 7b or the plural seams 7b. They may be used in a mixed manner.

In a case where the seal ring 8 is configured of the plural annular members, grooves, each of which has a depth equal to each thickness of the annular members (the seal ring 8) and a width equal to each width of the annular members, may be formed on the inner circumferential face of the retaining sleeve 7 along the seams 7b. The annular members are placed in these grooves. Each of the seams 7b is located in the center of the width of the grooves. According to this configuration, the inner circumferential face of the retaining sleeve 7 (including the annular members in its grooves) can be made smooth curved surface, and thereby the above-mentioned gaps along the radial direction are not formed. Therefore, the retaining sleeve 7 (including the annular members in its grooves) can hold the permanent magnets 6 by an entire of its inner circumferential face. The seal ring 8 of the present modified example is also made of metal, similarly to that in the first embodiment, but may be formed by CFRP.

By forming the seal ring 8 as a single hollow cylindrical member that covers all of the seams 7b, the leakage of the cooling fluid through the seams 7b can be prevented more reliably. On the other hand, by configuring the seal ring 8 by the plural annular members each of which covers at least one of the seams 7b, the material of the seal ring 8 can be saved and the mass of the rotor 2 can be reduced.

Figure 5:
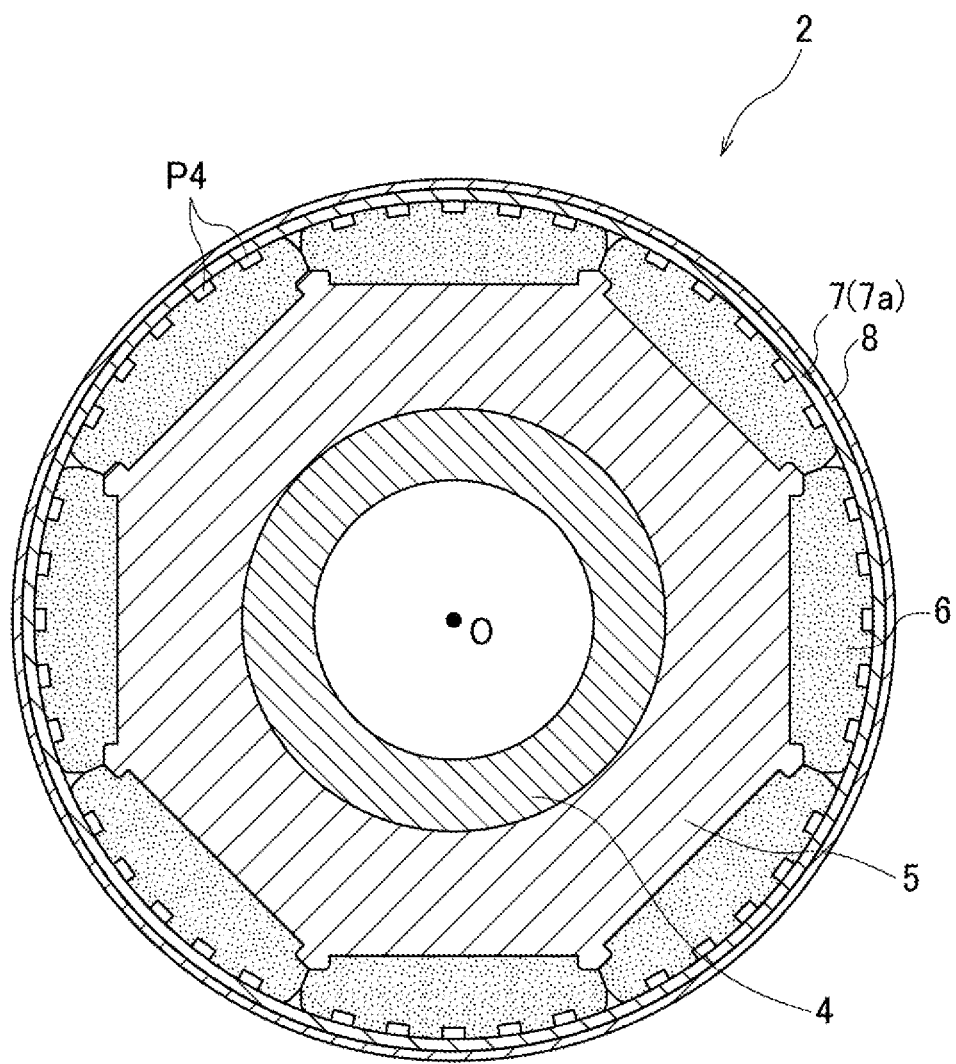
FIG. 5 is a cross-sectional view perpendicular to a rotation axis of a rotor according to a third embodiment.

Next, the rotor 2 according to a third embodiment will be described with reference to FIG. 5. Note that, identical or equivalent configurational components to those in the first embodiment will be labelled by reference signs identical to those in the first embodiment, and their detailed descriptions will be omitted. There is a difference between the rotor 2 of the present embodiment and the rotor 2 of the first embodiment in a disposition of the seal ring 8. The seal ring 8 of the first embodiment is disposed between the permanent magnets 6 and the retaining sleeve 7. The seal ring 8 of the present embodiment is disposed on the outer circumferential face of the retaining sleeve 7. The seal ring 8 in the present embodiment is a single hollow cylindrical member that covers all of the seams 7b. The seal ring 8 covers the seams 7b on a side of the outer circumference of the retaining sleeve 7 to prevent the cooling fluid from leaking through the seams 7b.

Also in the present embodiment, the seal ring 8 may be also configured of the plural annular members each of which covers at least one of the seams 7b (a modified example of the third embodiment). In this case, the plural annular members may be aligned in the rotation axis direction, and interspaces along the axial direction may be formed between adjacent annular members. Note that each of the annular members may cover only one of the seams 7b or the plural seams 7b. They may be used in a mixed manner.

Here, in order to keep the gap between the rotor 2 and the stator 3 constant, grooves, each of which has a depth equal to each thickness of the annular members (the seal ring 8) and a width equal to each width of the annular members, may be formed on the outer circumferential face of the retaining sleeve 7 along the seams 7b. The annular members are placed in these grooves. Each of the seams 7b is located in the center of the width of the grooves. According to this configuration, the outer circumferential face of the retaining sleeve 7 (including the annular members in its grooves) can be made smooth curved surface. The seal ring 8 of the present modified example is also made of metal, similarly to that in the first embodiment, but may be formed by CFRP. And, in the third embodiment and the modified example thereof, the axial flow channels P4 may be formed on the surface of the permanent magnets 6 on a side of the rotor core 5 (see the second embodiment in FIG. 4).

By forming the seal ring 8 as a single hollow cylindrical member that covers all of the seams 7b as described above, the leakage of the cooling fluid through the seams 7b can be prevented more reliably. On the other hand, by configuring the seal ring 8 by the plural annular members each of which covers at least one of the seams 7b, the material of the seal ring 8 can be saved and the mass of the rotor 2 can be reduced.

Although plural embodiments (the modified examples) have been described above, it is possible to modify or change the embodiments (the modified examples) based on the above disclosure. All the configurational elements of the above embodiments and all the features recited in the claims may be individually combined with each other as long as they do not contradict each other.

Note that the electrical rotating device 1 including the rotor 2 of the above embodiments is an electrical generator 1 that receives driving power and then generates electrical power. However, the rotor of the present disclosure can be also applied to an electrical motor that receives electrical power and then outputs driving power. In other words, the rotor of the present disclosure can be applied to an electrical rotating device such as an electrical generator or an electrical motor.

In addition, the permanent magnets 6 are divided into four parts along the rotation axis direction in the above embodiments, but the number of divisions is not limited to this. In addition, the retaining sleeve 7 is divided into the five divided sleeves 7a along the rotation axis direction in the above embodiments, but the number of divisions is not limited to this. In addition, the number of the axial flow channels P4 is also not limited to the number in the above embodiments. In addition, the axial flow channels P4 are formed linearly parallel to the rotation axis direction in the above embodiments. However, in order to increase the contact area between the permanent magnets 6 and the cooling fluid, the axial flow channels P4 may be formed in a meandering or zigzag manner.

In addition, the electrical rotating device 1 including the rotor 2 of the above embodiments has been described on the assumption that it is used in a high temperature environment. However, the rotor of the present disclosure does not necessarily have to be used in a high temperature environment, but may be used in other temperature environments. Also in such a case, the advantage of more reliably preventing leakage of the cooling fluid can be achieved. Note that, if the environment is not high temperature, the matrix resin for a case of using CFRP may be a thermoplastic resin instead of a thermosetting resin.

What is claimed is:

1. A rotor of an electrical rotating device, the rotor comprising:
   a rotor core;
   a plurality of permanent magnets mounted on an outer circumference of the rotor core;
   a retaining sleeve that is configured of a plurality of divided sleeves divided along a direction of a rotation axis of the rotor and holds the plurality of permanent magnets from an outer side of the plurality of permanent magnets;
   a seam formed between adjacent divided sleeves in the plurality of divided sleeves;
   a cooling fluid flow channel formed on each surface of the plurality of permanent magnets on a side of the retaining sleeve; and
   a seal ring that covers the seam from an outer circumferential side or an inner circumferential side.

2. The rotor of the electrical rotating device according to claim 1, wherein
   the seam comprises one or more seams, and
   the seal ring is a single hollow cylindrical member that covers all of the seams, and disposed between the retaining sleeve and the plurality of permanent magnets.

3. The rotor of the electrical rotating device according to claim 1, wherein
   the seam comprises one or more seams, and
   the seal ring is a single hollow cylindrical member that covers all of the seams, and disposed on an outer circumferential face of the retaining sleeve.

4. The rotor of the electrical rotating device according to claim 1, wherein
   the seam comprises one or more seams, and
   the seal ring is configured of a plurality of annular members which are aligned in the direction of the rotation axis and each of which covers at least one of the seams, and disposed on an outer circumferential face of the retaining sleeve.

5. The rotor of the electrical rotating device according to claim 1, wherein
   the seal ring is made of metal.

6. The rotor of the electrical rotating device according to claim 1, wherein
   the seal ring is made of CFRP.

* * * * *